Patented Mar. 6, 1945

2,370,788

UNITED STATES PATENT OFFICE 2,370,788

CATALYST PREPARATION

George R. Gilbert, Baytown, Tex., assignor to Standard Oil Development Company, a corporation of Delaware No Drawing. Application July 24, 1941, Serial No. 403,839

5 Claims. (Cl. 252—25)

The present invention is concerned with an improved catalyst. The invention is more particularly concerned with the production of this catalyst which is suitable for utilization in the processing of petroleum oils in which processes catalysts are employed. Operations of this character are, for example, the various cracking and reforming operations, as well as alkylation and isomerization operations. In accordance with the present invention the pores of a suitable catalyst carrier such as clay, kieselguhr, bauxite, and the like, are impregnated with an amalgam of aluminum and mercury. The mercury is removed by distillation and the residual aluminum preferably chlorinated with chlorine or with hydrogen chloride gas.

It is well known in the art to prepare numerous catalysts by various procedures. For example, in the preparation of aluminum type catalysts, it has been proposed that the same be prepared by injecting a mixture of bauxite and carbon into a vessel by means of a jet of chlorine which stream contains oxygen and nitrogen. In order to secure the desired reaction in such a process it is necessary to employ a relatively high temperature. Furthermore, the aluminum chloride catalyst prepared by this method has a relatively low efficiency, thus requiring a relatively large volume of the catalyst to bring about the desired catalytic reactions. Aluminum chloride type catalysts have also been produced by reacting chlorine with aluminum carbide and by reacting dry chlorine gas with aluminum metal.

While the aluminum chloride type catalysts prepared by the methods enumerated are satisfactory, all have the inherent disadvantage of producing a catalyst product which has a relatively small surface to volume ratio. Since most catalytic reactions are surface phenomena, it is very desirable to impart to the catalyst a form in which it has a relatively large surface to volume ratio.

I have now discovered an improved aluminum chloride catalyst which is characterized by having this feature. Furthermore, my catalyst has a high efficiency and is particularly adapted for use in certain reactions such as the various isomerization processes. My catalyst is prepared by impregnating a suitable carrier such as clay, kieselguhr, bauxite, and the like, with an amalgam of aluminum and mercury. The mercury is removed by distillation and the residual aluminum preferably chlorinated with chlorine or with a hydrogen chloride gas.

Suitable catalyst carriers are, for example, diatomaceous earth, bauxite, dehydrated silica and alumina gels, pumice, silicon carbide, and the like. The preferred carriers for the preparation of my catalyst, however, are kieselguhr and bauxite, as for example, dehydrated bauxite.

In accordance with this invention, the catalyst carrier, which for purposes of illustration is assumed to be bauxite, is prepared and then treated with an amalgam of aluminum and mercury as follows. The dehydrated bauxite is heated to a temperature in the range from about 400° C. to about 600° C. in order to free it of occluded gases. The pressure employed is in the range from atmospheric and about 2 mm. absolute pressure of mercury. By heating the bauxite in this manner under low pressures and at high temperatures, gases such as air which fill the pores of the bauxite are driven off. The gas-free bauxite is then cooled to a temperature in the range from about 100° C. to about 400° C. and treated with an aluminum-mercury amalgam containing from about 1% to about 10% of aluminum and from about 99% to about 90% of mercury. The amalgam is pumped into the vessel containing the bauxite under a pressure sufficient to prevent boiling of the amalgam. The interstices and pores of the evacuated bauxite thus become impregnated with the fluid amalgam. The excess amalgam is drained from the vessel. Although the temperature employed may vary considerably, the general temperature of treating the carrier is in the range of from about 100° C. to about 400° C. The preferred temperatures of treatment are in the range of about 200° C. to about 350° C.

The treated carrier containing impregnated thereon the aluminum and mercury is then distilled under conditions adapted to remove the mercury. In general, the temperatures employed for removing the mercury by distillation are in the range from about 100° C. to about 1000° C. preferably in the range from about 300° C. to about 400° C. The pressures are in the range from about 240 mm. to about 1600 mm. of mercury.

As a preferred procedure, the treated carrier containing impregnated thereon the aluminum and mercury is heated under pressure to prevent premature boiling off of the mercury. The pressure is then suddenly released, or reduced in stages in order to leave the aluminum metal deposited in and on the carrier.

The catalyst substantially free of mercury and containing adhered thereon the aluminum is then preferably chlorinated as follows: A chlorine gas preheated to a temperature in the range from about 100° C. to about 180° C. is fed into the vessel containing the aluminum impregnated catalyst carrier. Preferably, the chlorine gas is fed into the vessel at or near the bottom at a rate so that the heat of the initial reaction is carried up the vessel. In this manner the reaction will be caused to progress up the vessel until essentially all of the catalyst carrier is impregnated with aluminum chloride. The temperature of the dry chlorine gas entering the chamber containing the impregnated catalyst carrier should be decreased slightly after the start of the reaction in order to prevent the temperature of the aluminum chloride formed in and on the carrier from rising above about 177° C., since above this temperature aluminum chloride will sublime and be carried out of the catalyst carrier or will melt and flow down the vessel containing the catalyst. Proper control of temperature is essential in this reaction so that the aluminum chloride will be formed in and on the catalyst carrier and yet will not flow therefrom. Inert gases such as nitrogen and the like may be admixed with the chlorine entering the catalyst chamber to remove heat of reaction.

The process of the present invention may be widely varied. Although a preferred embodiment of my invention has been used to illustrate the improved methods of preparing aluminum chloride catalyst, the dehydrated catalyst carrier may be impregnated with the aluminum-mercury amalgam by other methods. For example, in some instances it may be desirable to mechanically admix the catalyst carrier with the aluminum-mercury amalgam. In these instances, after the catalyst carrier has become saturated with the aluminum-mercury amalgam, the excess amalgam is drawn off and the impregnated carrier introduced into a vessel containing liquefied or gaseous chlorine. It is desirable that the chlorine be in an essentially pure state or admixed with other liquefied or gaseous inert materials.

Although temperatures between about 100° C. and 180° C. have been indicated to be the preferred range for converting the metallic aluminum deposited on the catalyst carrier to aluminum chloride, in some instances it may be desirable to employ other conditions. For example, it may be desirable to convert the aluminum to aluminum chloride under a superimposed pressure. In this case, a pressure below about 93.5 atmospheres and a temperature below about 146° C. should be employed.

The aluminum-mercury amalgam may be made in a number of ways. For example the amalgam may be prepared by fusing aluminum and mercury in a neutral gas atmosphere such as in an atmosphere of carbon dioxide or nitrogen. Another method of preparing the aluminum-mercury amalgam consists in contacting liquid mercury with aluminum metal in the presence of an alkali metal hydroxide such as sodium hydroxide, or potassium hydroxide. The metallic aluminum may be contacted with mercury in acidulated water. Still other methods are obvious to those versed in the art.

In general, when operating in accordance with this invention at a temperature of about 100° C., the aluminum-mercury amalgam will consist of approximately 2.5 molar per cent of aluminum and 97.5 molar per cent of mercury. At around 300° C. the amalgam will contain approximately 5 molar per cent of aluminum and 95 molar per cent of mercury. A preferred amalgam, however, contains from about 1 to about 10 per cent of aluminum and from about 99 to about 90 per cent of mercury. The amount of aluminum in the amalgam, however, will vary in accordance with the temperature.

The catalyst prepared in the foregoing manner has among others the following advantages. The catalysts prepared in accordance with this invention are more efficient and economical to use than aluminum chloride catalysts prepared in the customary manner. Also the catalyst which I have described has a greater surface to volume ratio than those prepared in the conventional manner. Aluminum chloride type catalysts produced by conventional methods may be deposited on catalyst carriers but it is economically impracticable to saturate the pores of a given catalyst carrier with the conventionally produced aluminum chloride. On the other hand, aluminum chloride produced in accordance with this invention is formed in the pores and on the catalyst carrier. Another advantage of the catalyst prepared in accordance with this invention is that the aluminum chloride may be prepared from any form of aluminum metal such as filings, turnings, scrap, sheet and the like; whereas in preparing the conventional form of aluminum chloride when bauxite is not the starting material it is necessary to prefabricate the metal in the form of sheet or leaf aluminum. Furthermore, when preparing aluminum chloride from sheet or leaf aluminum the chlorine or hydrogen chloride gas attacks only a small surface of the aluminum.

This catalyst is suitable for various operations. For example, aluminum chloride prepared in accordance with this invention may be employed to isomerize normal paraffins to the isoparaffins. Usually when isomerizing the normal paraffin it is customary to employ a temperature up to about 100° C. and sufficient pressure to maintain the hydrocarbons in the liquid phase.

It is also known to add hydrogen chloride gas or chlorine to the catalyst as a promoter. Many other uses for the improved type of catalyst may be found. For example, premium lubricating oils may be obtained by treating various hydrocarbon fractions with aluminum chloride. It is also well known that aluminum chloride catalysts are suitable for dealkylation reactions. A particularly desirable use for the the aluminum chloride catalyst is the conversion of xylenes to toluene at temperatures in the range up to about 100° C. Other uses of the improved type catalyst will be apparent to those skilled in the art; for example, the improved catalyst may be used in polymerization, in alkylation, and in the like type of reaction.

Although the invention has been described with reference to the production of aluminum chloride catalyst, it is apparent that the method is applicable to production of other types of aluminum catalysts such as the bromides, iodides or fluorides. In such instances the corresponding element would be introduced into the vessel containing the catalyst carrier upon which the elementary aluminum is deposited or the acid of the element may be introduced in the form of dry or essentially dry gases.

This invention is not to be restricted to the preparation of aluminum chloride catalysts.

Other types of metallic catalysts may be deposited upon catalyst carriers by this method. For example, aluminum oxide, aluminum sulphate, and other similar types of aluminum salts or compounds may be deposited on carriers by contacting the aluminum after removal of mercury therefrom with oxygen-containing gases such as air or other oxygenated compounds, or with anhydrous $SO_3$ in a liquid or gaseous form, or with solutions of sulphuric acid. Other easily amalgamated metals may be substituted for the aluminum. Thus, it may be desirable to prepare zinc-mercury amalgams for deposition on catalyst carriers as described herein.

Other variations of this invention are apparent to those skilled in the art.

What I claim as new and wish to protect by Letters Patent is:

1. Process for the preparation of an aluminum chloride catalyst supported on a carrier which comprises treating a suitable carrier with an amalgam of aluminum and mercury, heating said treated carrier under conditions to distill off the mercury, then treating said carrier containing aluminum supported thereon with a chlorine containing gas.

2. Process as defined by claim 1 in which said carrier is selected from the class consisting of clay, kieselguhr, and dehydrated bauxite.

3. Process as defined by claim 1 in which the carrier is treated with said amalgam at a temperature in the range between about 200° C. and about 350° C.

4. A process for the preparation of an aluminum halide catalyst supported on a carrier which comprises subjecting the carrier to a heat treatment capable of dispelling occluded gases and volatile matter from the pores thereof, impregnating the carrier with an amalgam of aluminum and mercury, heating the impregnated carrier under conditions to distill off the mercury and then treating the carrier containing aluminum supported thereon with a halogen.

5. A process for the preparation of an aluminum halide catalyst supported on a carrier which comprises treating a suitable carrier with an amalgam of aluminum and mercury, heating said treated carrier under suitable conditions to distill off the mercury and then treating said carrier containing aluminum supported thereon with a halogen.

GEORGE R. GILBERT.